US009766860B2

(12) United States Patent
Bitner et al.

(10) Patent No.: US 9,766,860 B2
(45) Date of Patent: Sep. 19, 2017

(54) DYNAMIC SOURCE CODE FORMATTING

(71) Applicant: SAP SE, Walldorf (DE)

(72) Inventors: Mattan Bitner, Tel-Aviv (IL); Tsahar Sobe, Petah-Tikva (IL)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 14/882,982

(22) Filed: Oct. 14, 2015

(65) Prior Publication Data

US 2017/0109139 A1  Apr. 20, 2017

(51) Int. Cl.
*G06F 9/44* (2006.01)
(52) U.S. Cl.
CPC ...................... *G06F 8/33* (2013.01)
(58) Field of Classification Search
CPC ......................................................... G06F 8/33
USPC .......................................................... 717/113
See application file for complete search history.

(56) References Cited

U.S. PATENT DOCUMENTS

| | | | | |
|---|---|---|---|---|
| 7,293,232 | B2 * | 11/2007 | Arkhipov | G06Q 10/10 715/264 |
| 2005/0187753 | A1 * | 8/2005 | Salter | G06F 17/2725 704/2 |
| 2011/0258538 | A1 * | 10/2011 | Liu | G06F 17/2211 715/256 |
| 2012/0210298 | A1 * | 8/2012 | Hodgins | G06F 8/71 717/113 |
| 2014/0365955 | A1 * | 12/2014 | DeLuca | G06F 3/0481 715/788 |

OTHER PUBLICATIONS

Jef Raskin, "Comments Are More Important Than Code", Mar. 2005, pp. 62-64.*
Virendra Kumar Swarnkar et al., "A Survey on Performance of different Text Editor", Jul. 2013, pp. 76-78.*
Responsive Web Designed; Wikipedia, 5 pages; http://en.wikipedia.org/wiki/Responsive_web_design; last revisited Aug. 21, 2015.

* cited by examiner

*Primary Examiner* — Wei Zhen
*Assistant Examiner* — Lanny Ung
(74) *Attorney, Agent, or Firm* — Fish & Richardson P.C.

(57) ABSTRACT

The present disclosure involves systems, software, and computer implemented methods for predicting critical events using log data. One example method includes receiving an event regarding a visible portion of a window of a programming editor used to display software source code. A currently visible portion of the programming editor window and a content type of the software source code are identified. Syntax rules associated with the content type are determined. Dynamic formatting rules are determined based on the syntax rules of the content type and the currently visible portion of the programming editor window. The dynamic formatting rules are applied to display the software source code in the currently visible portion of the programming editor window in response to the event.

18 Claims, 7 Drawing Sheets

DYNAMIC SOURCE CODE FORMATTING

TECHNICAL FIELD

The present disclosure relates to computer-implemented methods, software, and systems for dynamically formatting source code.

BACKGROUND

Programmers can edit source code using an IDE (Integrated Development Environment). Some IDEs can include a code beautifying function, in which the source code is displayed with formatting. For example, when editing source code in a particular language, the source code can be displayed using indentation rules associated with the particular language. The IDE can be configured to support code beautifying functions in multiple source code languages of different types.

SUMMARY

The present disclosure involves systems, software, and computer implemented methods for dynamically formatting source code. One example method includes receiving an event regarding a visible portion of a window of a programming editor used to display software source code. A currently visible portion of the programming editor window and a content type of the software source code are identified. Syntax rules associated with the content type are determined. Dynamic formatting rules are determined based on the syntax rules of the content type and the currently visible portion of the programming editor window. The dynamic formatting rules are applied to display the software source code in the currently visible portion of the programming editor window in response to the event.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A developer can use a programming editor to edit software source code. The programming editor can receive an event notification regarding a visible portion of a window used to edit the software source code. For example, the event can indicate that the window has been loaded or resized, or that another window is either now or no longer partially covering the window. In response to the event, the editor can identify a content type (e.g., programming language type) of the software source code and syntax rules associated with the content type. The syntax rules can relate, for example, to tokenization and line-break rules. The editor can determine one or more formatting rules based on the syntax rules and the visible portion of the window. For example, the editor can determine whether a particular line of code can be split onto multiple lines to improve readability or visibility of the software source code. The editor can apply the dynamic formatting rules to the software source code displayed in the window, in response to the event.

Dynamically formatting code in response to an event can result in more readable code as compared to what may be achieved using a code "beautifier" or a static editor setting such as a line wrap setting. A static line wrap setting may not be appropriate or useful for a particular window size, for example. A code beautifier can format source code such as by applying a style to an identifier that is a language keyword, but a code beautifier is not configured to adjust formatting to changing window sizes, for example.

Figure 1:
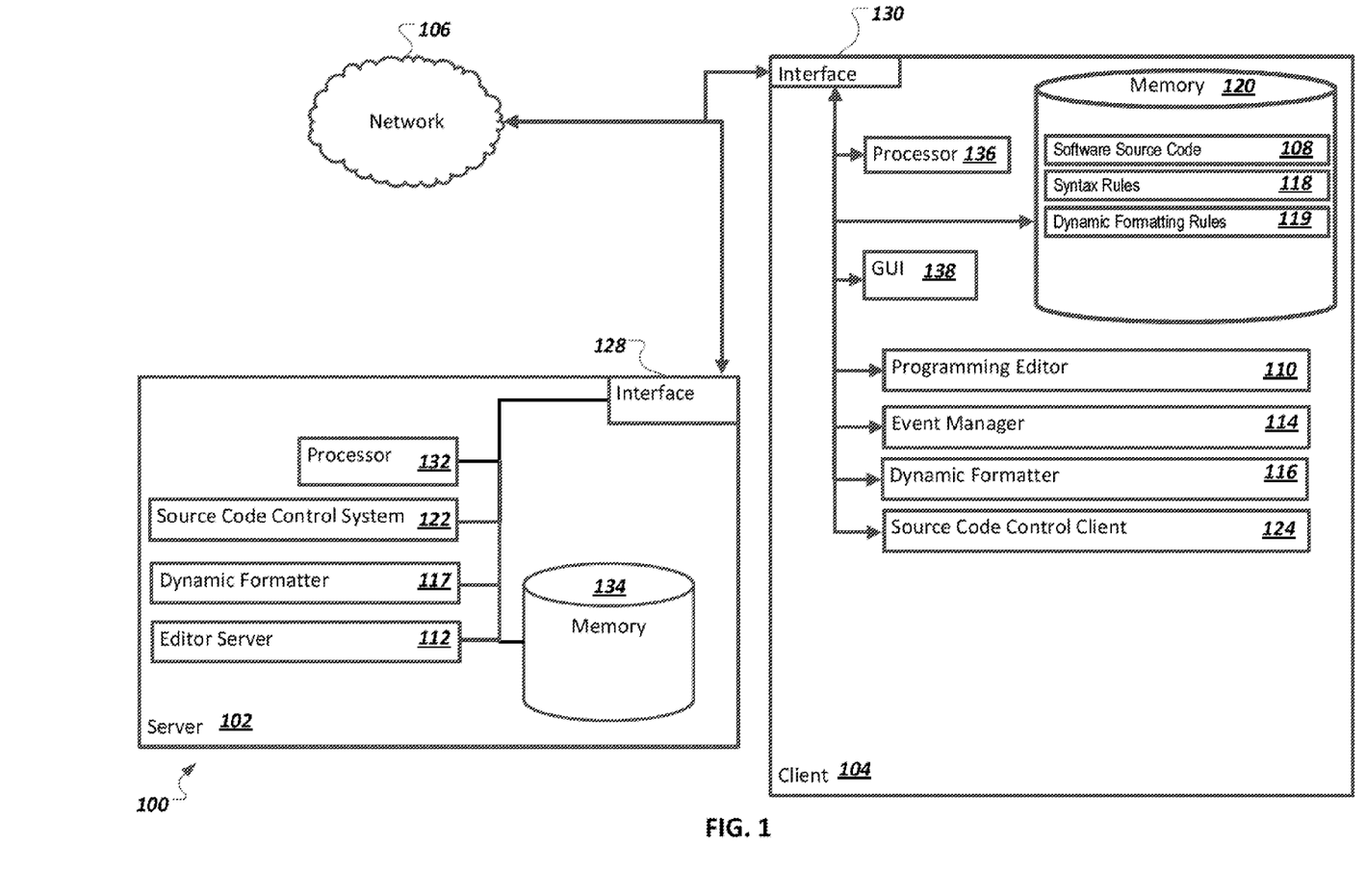
FIG. 1 is a block diagram illustrating an example system for dynamically formatting source code.

FIG. 1 is a block diagram illustrating an example system 100 for dynamically formatting source code. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

A developer can use the client device 104 for editing software source code 108 (or some other type of content) in a programming editor 110. The programming editor 110 can be part of, for example, an IDE (Integrated Development Environment). In some implementations, the programming editor 110 is a client program served by an editor server 112 running on the server 102.

An event manager 114 running on the client device 104 can receive events that relate to windows of the programming editor 110. For example, the event manager 114 can receive an event (e.g., a document object model (DOM) event) indicating that a window of the programming editor 110 has been loaded or resized, or that another window is now or no longer overlapping the window. The event manager 114 can forward events that relate to a change in a currently visible portion of a window to a dynamic formatter 116 running on the client device 104. For example, the dynamic formatter 116 can be a component of the programming editor 110. As another example, a dynamic formatter 117 running on the server 102 can receive event notifications from the event manager 114.

In response to a received event, the dynamic formatter 116 (or the dynamic formatter 117 at the server 102) can determine whether to reformat the software source code 108, or the presentation of the software source code 108, to improve the display of the software source code 108 in the currently visible portion of the window. For example, if the window has been resized to be a smaller window, the dynamic formatter 116 can determine whether to split one or more lines of the software source code onto multiple lines (e.g., to display the entire line(s) of software source code so that the developer does not need to scroll the window to see the entire line(s)). For example, the dynamic formatter 116 can determine a maximum number of characters per line based on the currently visible portion of the window and can wrap lines longer than the maximum number of characters onto subsequent lines of the programming editor 110. As yet another example, if the window has been resized to be a larger window after prior adjustments, the dynamic formatter 116 can determine whether to merge lines of code that had formerly been included in a single line of code prior to earlier changes back into the single line of code as originally presented or provided.

The dynamic formatter 116 can identify a content type (e.g., programming language type) associated with the software source code 108. The dynamic formatter 116 can identify syntax rules 118 associated with the identified content type. The syntax rules can include rules relating to tokenization and line-break rules, for example. Other syntax rules examples include rules regarding indentation of software source code, such as how many characters to indent for each indentation, whether to use a tab character or a set of spaces, etc.

The dynamic formatter 116 can determine one or more dynamic formatting rules 119 to be applied to the software source code 108, based on the identified syntax rules 118 and on the currently visible portion of the window associated with the received event. For example, the dynamic formatter 116 can determine whether to split a source code line into multiple lines so that the developer can see an entire source code line without having to scroll the window. As another example, the dynamic formatter 116 can determine a combination of font-face, font-size, tab-width, border-spacing, padding, line-spacing, and other settings which can result in a best combination of number of visible lines of software source code and code readability as compared to other combinations of settings.

The determined dynamic formatting rules 119 can be rules that, when applied, result in syntactically correct code with respect to the identified syntax rules 118, but which can modify or otherwise dynamically change the presentation of the source code 108 while maintaining said syntax rules 118. For example, a line break may be inserted into the software source code at an identified position to improve readability if the syntax rules 118 allow a line break to be inserted at the identified position. For example, the line break can be inserted at a position that does not split a token (e.g., an identifier) included in the software source code. As another example, the line break can be inserted in the middle of a language statement of a certain identified statement type (e.g., an if statement) if the syntax rules 118 indicate that a line break can be inserted into a statement of the identified statement type.

Although insertion of line breaks is discussed, in some implementations, the appearance of the software source code 108 in the window is modified without changing the underlying software source code 108 (e.g., the software source code 108 that is stored in memory 120 or in disk storage may or may not be changed by the dynamic formatter 116). When the underlying software source code 108 is modified by the dynamic formatter 116, the dynamic formatter 116 can receive a request to revert any changes made to the software source code 108, such as when the software source code 108 is being checked into a source code control system 122 (e.g., the source code control system 122 can be associated with the server 102 or another server). For example, a source code control client 124, which may or may not be associated with the programming editor 110, may send a notification to the dynamic formatter 116 (e.g., either directly or indirectly through the event manager 114) regarding a request to check in the software source code 108. Other examples of dynamic formatting of source code are discussed in more detail below.

As used in the present disclosure, the term "computer" is intended to encompass any suitable processing device. For example, although FIG. 1 illustrates a single server 102 and a single client device 104, the system 100 can be implemented using a single, stand-alone computing device, two or more servers 102 or two or more clients 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 128 and 130 are used by the server 102 and the client device 104, respectively, for communicating with other systems in a distributed environment—including within the system 100—connected to the network 106. Generally, the interfaces 128 and 130 each comprise logic encoded in software and/or hardware in a suitable combination and operable to communicate with the network 106. More specifically, the interfaces 128 and 130 may each comprise software supporting one or more communication protocols associated with communications such that the network 106 or interface's hardware is operable to communicate physical signals within and outside of the illustrated system 100.

The server 102 includes one or more processors 132. Each processor 132 may be a central processing unit (CPU), a blade, an application specific integrated circuit (ASIC), a field-programmable gate array (FPGA), or another suitable component. Generally, each processor 132 executes instructions and manipulates data to perform the operations of the server 102. Specifically, each processor 132 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 134. In some implementations, the server 102 includes multiple memories. The memory 134 may include any type of memory or database module and may take the form of volatile and/or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the programming editor 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 136. Each processor 136 included in the client device 104 may be a central processing unit (CPU), an application specific integrated circuit (ASIC), a field-programmable gate array (FPGA), or another suitable component. Generally, each processor 136 included in the client device 104 executes instructions and manipulates data to perform the operations of the client device 104. Specifically, each processor 136 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 138.

The GUI 138 of the client device 104 interfaces with at least a portion of the system 100 for any suitable purpose, including generating a visual representation of the programming editor 110. The programming editor 110 can present the software source code 108, including any changes to the software source code 108 or changes to the appearance of the software source code 108, in the GUI 128. The GUI 138 may be used to view and navigate various Web pages. Generally, the GUI 138 provides the user with an efficient and user-friendly presentation of business data provided by or communicated within the system. The GUI 138 may comprise a plurality of customizable frames or views having interactive fields, pull-down lists, and buttons operated by the user. The GUI 138 contemplates any suitable graphical user interface, such as a combination of a generic web browser, intelligent engine, and command line interface (CLI) that processes information and efficiently presents the results to the user visually.

The memory 120 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2A:
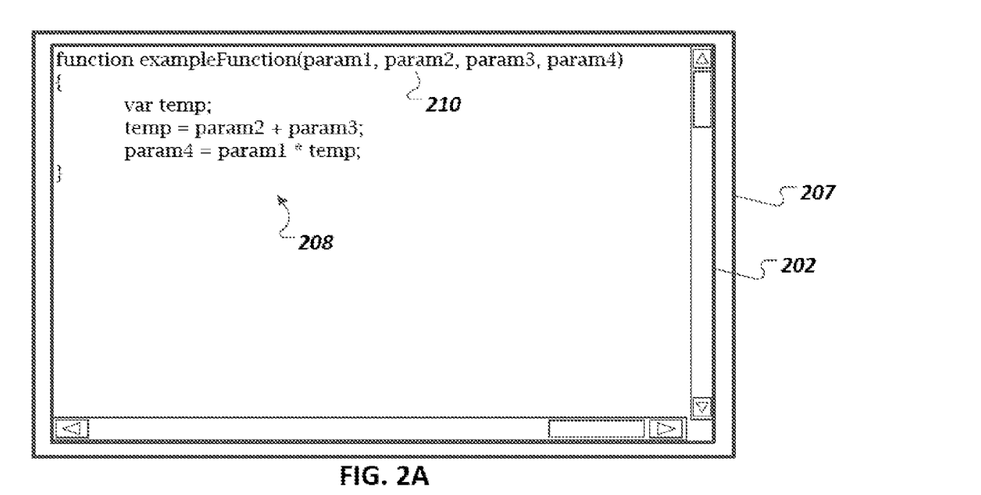
FIGS. 2A and 2B illustrate dynamic source code formatting in response to the resizing of a programming editor window.
Figure 2B:
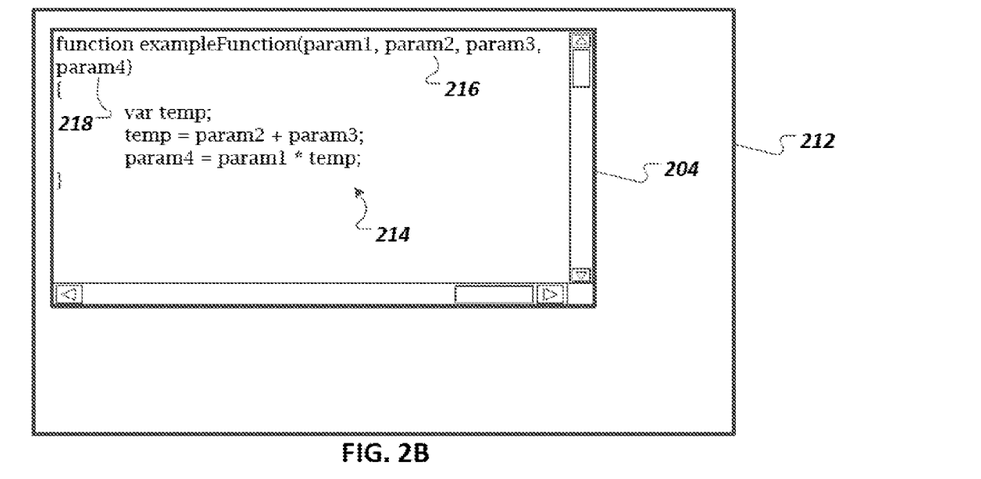
Figure 2C:
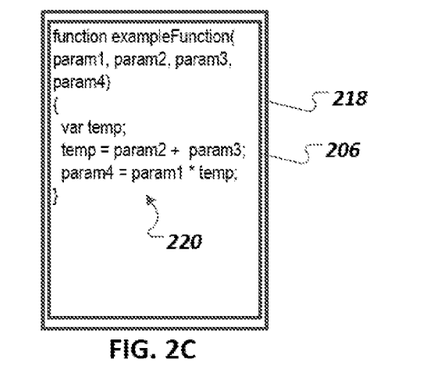
FIG. 2C illustrates dynamic source code formatting in response to the source code being displayed on a mobile device.

FIGS. 2A to 2C illustrate example programming editor windows 202, 204, and 206. The programming editor window 202 is displayed, for example, on a desktop display device 207. The programming editor window 202 displays source code 208. The source code 208 includes a function line 210 that includes four parameters (i.e., param1, param2, param3, param4).

A formatter associated with the programming editor window 202 can receive an event notification regarding a resizing of the programming editor window 202. For example, the user can resize the programming editor window 202 by dragging a corner of the window in to display a smaller window 202. For instance, the programming editor window 204 displayed on a display device 212 in FIG. 2B illustrates a resizing of the programming editor window 202.

The formatter, in response to receiving the event notification regarding the resizing of the programming editor window 202, can determine the size of the resized programming editor window 204. The formatter can identify a content type of source code 214 displayed in the programming editor window 204. The content type can, for example, be a programming language type, such as JavaScript. The formatter can identify syntax rules associated with the content type, including, for example, syntax rules regarding tokenization of the content type, line break rules, formatting rules, style rules or preferences, or other rules associated with the content type.

The programming editor can determine dynamic formatting rules based on the syntax rules and the visible portion of the programming editor window 204. The dynamic formatting rules can include, for example, rules for formatting or changing the source code based on the identified syntax rules and on the determined size of the resized programming editor window 204. The formatter can, in response, to the event notification, apply the dynamic formatting rules to the displayed source code 214 to present the displayed source code in the resized programming editor window 204 according to the dynamic formatting rules.

For example, the formatter can identify the content type of the source code 214 as JavaScript code and identify syntax rules associated with JavaScript, such as rules for tokens (e.g., variables, language keywords) and rules that indicate that JavaScript is a free-formatting language (e.g., that whitespace, including line breaks, is not significant if the white space does not occur within a token of the source code 214).

The formatter can determine that a function line 216 corresponding to the function line 210 is too long to be completely displayed in the resized programming editor 204 in the currently displayed font. The formatter can determine to display a portion 218 of the function line 216 on a next line of the programming editor window 204. The formatter can determine, based on the identified syntax rules, that "param4" is an identifier that should be maintained as an unbroken sequence of characters. Accordingly, the formatter includes the entire "param4" identifier in the portion 218 and does not split the "param4" identifier across multiple lines of the programming editor window 204.

As another example and as shown in FIG. 2C, the programming editor window 206 is displayed on a mobile device 218. A formatter associated with the programming editor window 206 can receive, for example, an event notification regarding the loading of the programming editor window 206. The formatter can determine the initial size of the programming editor window 206 and the content type (e.g., JavaScript) of source code 220 displayed in the programming editor window 206. The formatter can format the display of the source code 220 based on syntax rules of the identified content type and on the initial size of the programming editor window 206. Formatting can include, for example, splitting a first line of source code (e.g., including the "function" keyword) onto three lines of the programming editor window 206. Formatting can also include setting a tab width to be less than a tab width used for larger programming editor windows (e.g., a tab size used for the programming editor window 206 can be two spaces as compared to four spaces used for the programming editor window 204).

Formatting can include selecting a font face and/or a font size. A font size can be selected so as to minimize the number of source code lines to be split across multiple lines of the programming editor window 206. For example, a smaller font size (e.g., 10 point) can be selected instead of a larger font size (e.g., 12 point) if less source code lines need to be split when using the smaller font size. A minimum font size can be identified (e.g., based on a predetermined minimum font size selected based on readability and/or based on a user preference for a minimum font size). A default font size can be identified (e.g., 12 point), based on a predetermined default font size and/or based on a user preference. The default font size can be selected over a larger font size, for example, if using the larger font size would not result in any less split lines or less than a threshold number of less split lines, as compared to using the default font size.

A default font face can be identified (e.g., based on a predetermined default font face (e.g., Courier New) or based on a user preference). A different font face can be used, in some implementations, if using the different font face results in less split lines or more than a threshold number of less split lines as compared to using the default font face. For example, a selected Arial Narrow font face of a selected font size of 10 point can be used to display the source code 220, as compared to a default font face of Courier New and a default font size of 12 point, based on the selected font face and font size resulting in one line (e.g., the "function" line) being need to be split as compared to, for example, three lines needing to be split if the default font face and font size were used.

Figure 3A:
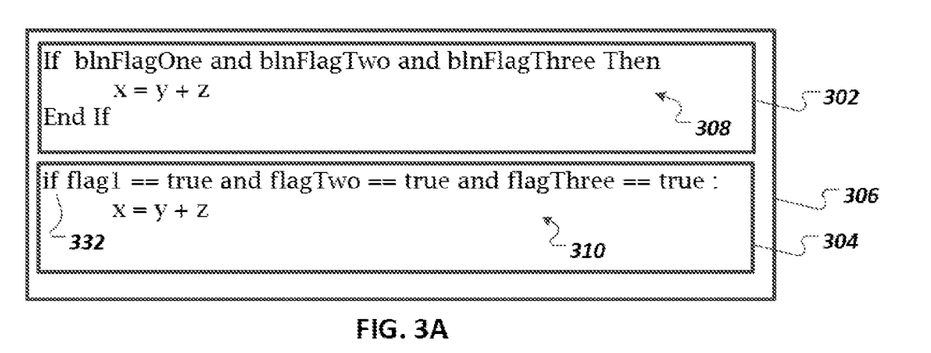
FIGS. 3A to 3C illustrate dynamic source code formatting in response to the resizing of programming editor windows.

FIG. 3A illustrates programming editor windows 302 and 304 displayed in a programming editor 306. The programming editor windows 302 and 304 are displaying source code 308 and 310, respectively. The programming editor 306 can receive first and second event notifications that the programming editor windows 302 and 304 have been resized, respectively.

Figure 3B:
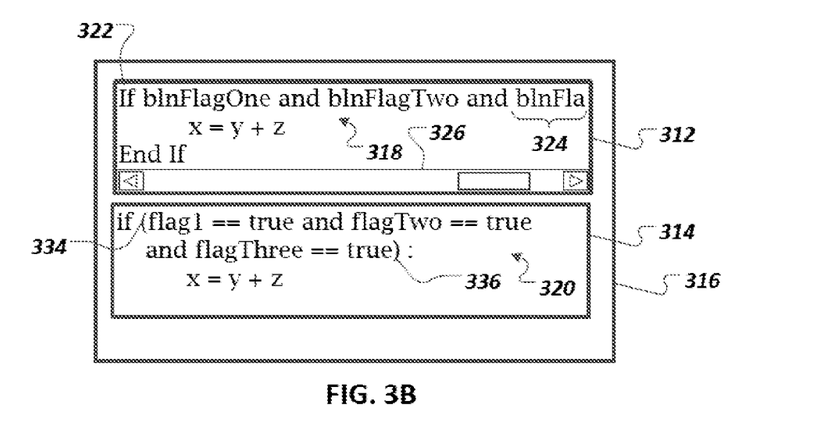

FIG. 3B, for example, illustrates resized programming editor windows 312 and 314 (respectively corresponding to the programming editors windows 302 and 304) respectively displaying source code 318 and 320 in a programming editor 316. In response to receiving the event notification regarding the resizing of the programming editor window 302 to the resized programming editor window 312, a formatter associated with the programming editor 316 can identify a content type of the source code 318 (e.g., Visual Basic). The formatter can identify syntax rules corresponding to the identified content type, including, for example, an if statement formatting rule specifying that the first line of an if statement 322 needs to be on a single line in the source code 318. That is, the source code 322 is not syntactically correct if the first line of the if statement 322 is split onto multiple lines. Accordingly, the formatter can determine to not split the first line of the if statement 322. Not splitting the first line of the if statement 322 can result in a portion 324 of the first line of the if statement 322 being clipped (e.g., partially visible) and a portion of the first line of the if statement 322 being not visible (e.g., the text "gThree Then" is not visible). The user can use a horizontal scroll bar 326 to view the unseen portion of the if statement 322.

Figure 3C:
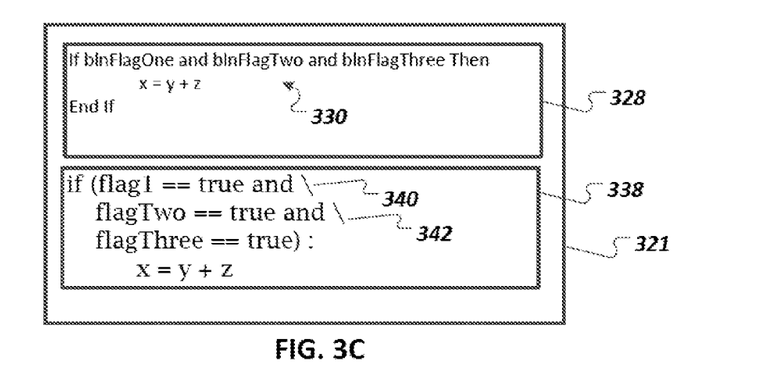

FIG. 3C illustrates another example response to the resizing of a programming editor window. A programming editor window 328 of a programming editor 321 is a resized version of the programming editor window 302. A formatter associated with the programming editor 321 can, in response to the resizing of the programming editor window 302, automatically adjust a font size and/or a font face used to display source code 330 in the resized programming editor window 328. A font face and font size can be selected, for example, so that the source code 330 is visible without the user needing to horizontally and/or vertically scroll the programming editor window 328. A font size can be reduced, for example, down to a minimum font size that is a predetermined minimum font size or a user-preferred minimum font size.

Referring again to FIG. 3B, in response to receiving the event notification regarding the resizing of the programming editor window 304 to the resized programming editor window 314, the formatter associated with the programming editor 316 can identify a content type of the source code 310 (e.g., Python). The formatter can identify syntax rules corresponding to the identified content type, including, for example, an if statement formatting rule specifying that, outside of the use of parentheses or an explicit line-continuation character, the first line of an if statement 332 needs to be on a single line in the source code 310.

The formatter can identify dynamic formatting rules associated with the content type of the source code 310, such as a parentheses rule that says that an if statement condition can be split across multiple lines if the condition is enclosed within parentheses. The formatter can apply the parentheses rule to the source code 310 to produce the source code 320 displayed in the resized programming editor window 314. The source code 320 includes, for example, a left parentheses 334 and a right parentheses 336 surrounding an if-statement condition. The use of the left parentheses 334 and the right parentheses 336 allows the formatter to split the first line of the if statement onto multiple lines while maintaining syntax correctness of the if statement. If the user resizes the programming editor window 314 again, such as back to the size of the programming editor 304, the formatter can remove the left parentheses 334 and the right parentheses 336 if the first line of the if statement can be displayed on one line without the user needing to horizontally scroll the programming editor window 304.

As another example and as shown in FIG. 3C, a programming editor window 328 of the programming editor 321 is a resized version of the programming editor window 304. A formatter associated with the programming editor 321 can, in response to the resizing of the programming editor window 304, identify the content type of the source code 310 as Python and identify the if statement syntax rule that specifies that outside of the use of parentheses or an explicit line-continuation character, the first line of an if statement 332 needs to be on a single line in the source code 310. The formatter can identify a line-continuation character formatting rule that indicates that a Python source code statement can be split onto multiple lines if a line-continuation character (e.g., "\") is inserted at the end of each line of the statement except the last line. For example, the formatter has inserted line continuation characters 340 and 342, which allows for syntax-compliant displaying of the if statement in the source code 310 onto three lines, as shown in the programming editor window 338.

Figure 4A:
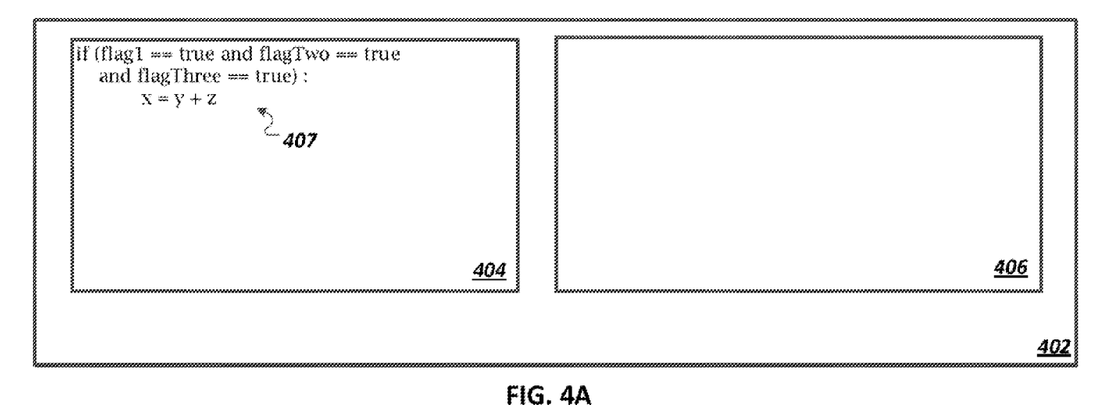
FIGS. 4A and 4B illustrate dynamic source code formatting in response to the partial covering of a programming editor window.

FIG. 4A illustrates a display device 402 on which a programming editor window 404 and another window 406 are displayed. Source code 407 is displayed in the programming editor window 404. A formatter associated with the programming editor window 404 can receive an event notification that the programming editor window 404 is partially visible.

Figure 4B:
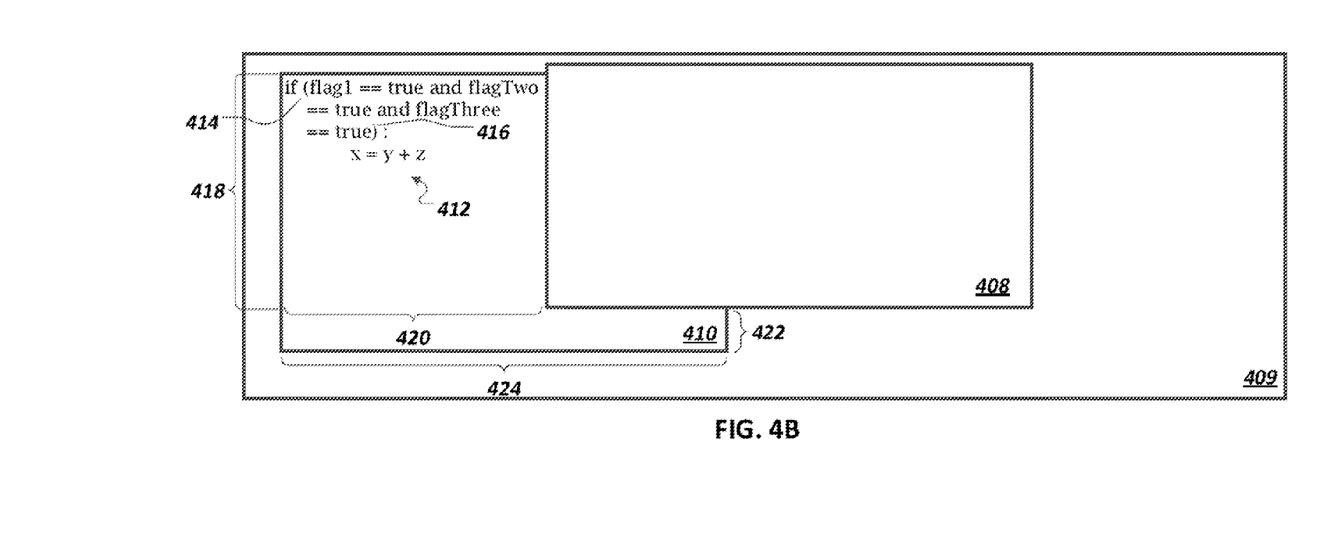

For example and as illustrated in a display device 409 in FIG. 4B, the other window 406 has been moved to a new location. For example, a second window 408, now partially covering a programming editor window 410 corresponding to the programming editor window 404, illustrates the new position of the other window 406. In response to the event notification that the programming editor window 410 is partially covered, a formatter associated with the programming editor window 410 can identify a content type (e.g., Python language code) associated with source code 412 displayed in the programming editor window 410. The formatter can identify syntax rules, including line break rules, associated with the identified Python language content type. For example, a rule can be identified that specifies that an expression enclosed within parentheses can be legally split onto multiple lines. The formatter can, based on the identified syntax rules and the size and parameters of the currently visible portion of the programming editor window 410, determine that the expression enclosed by a left parentheses 414 and a right parentheses 416 can be split onto three lines as currently illustrated by the source code 412. The expression can be split onto the three lines so that the expression is visible, without a need to scroll, within the currently visible portion of the programming editor window 410. If the user moves the other window 408 off of the programming editor window 410, the formatter can receive an event and can reformat the source code 412 back to an original state as reflected by the source code 407, to take advantage of the now uncovered portion of the programming editor window 410.

In some implementations, when another window, such as the other window 408, overlaps the programming editor window 410, the formatter can identify multiple regions of the programming editor window 410, with each region having a different visible width. For example, a first region associated with a top portion of the programming editor window 410 can be identified that has a height 418 and a width 420. The formatter can format a first portion of the source code 412 according to the width 420, for example. A second region having a height 422 and a width 424 can be identified, and if there is enough source code lines in the source code 412 to display source code in the second region, the formatter can format a second portion of the source code 412 in the second region according to the width 424 (e.g., the formatter can take advantage of the wider second region and display longer source code lines in the second region as compared to source code displayed in the first region).

Figure 5A:
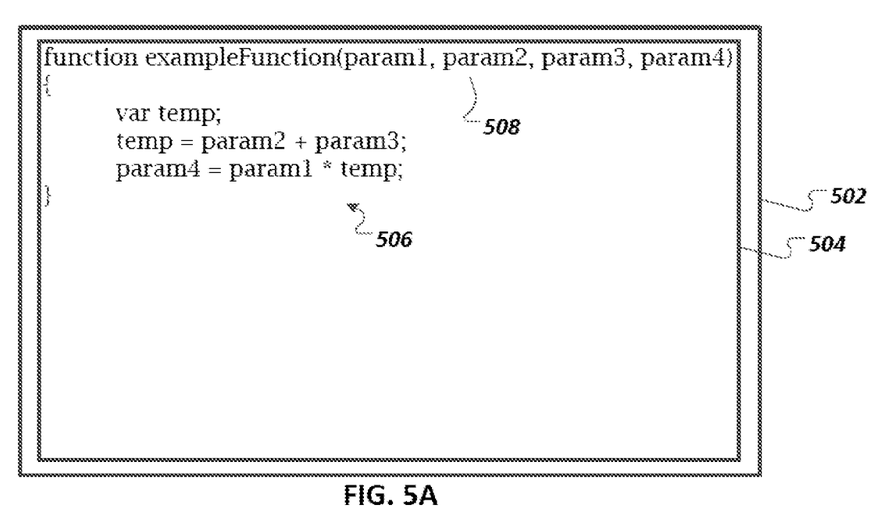
FIGS. 5A and 5B illustrate dynamic source code formatting in response to the opening of a new window in a programming editor.
Figure 5B:
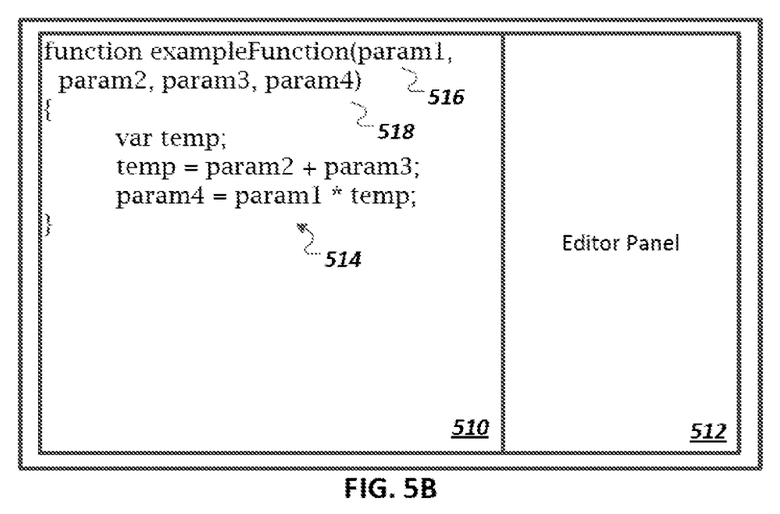

FIG. 5A illustrates a display device 502 on which a programming editor window 504 displaying source code 506 is displayed. The source code 506 includes a function line 508. FIG. 5B illustrates a programming editor window 510 corresponding to the programming editor window 504 which has been resized due to the opening of a programming editor panel 512. A formatter associated with the programming editor window 510 can receive an event notification regarding the resizing of the programming editor window 504 to the programming editor window 510.

Figure 6:
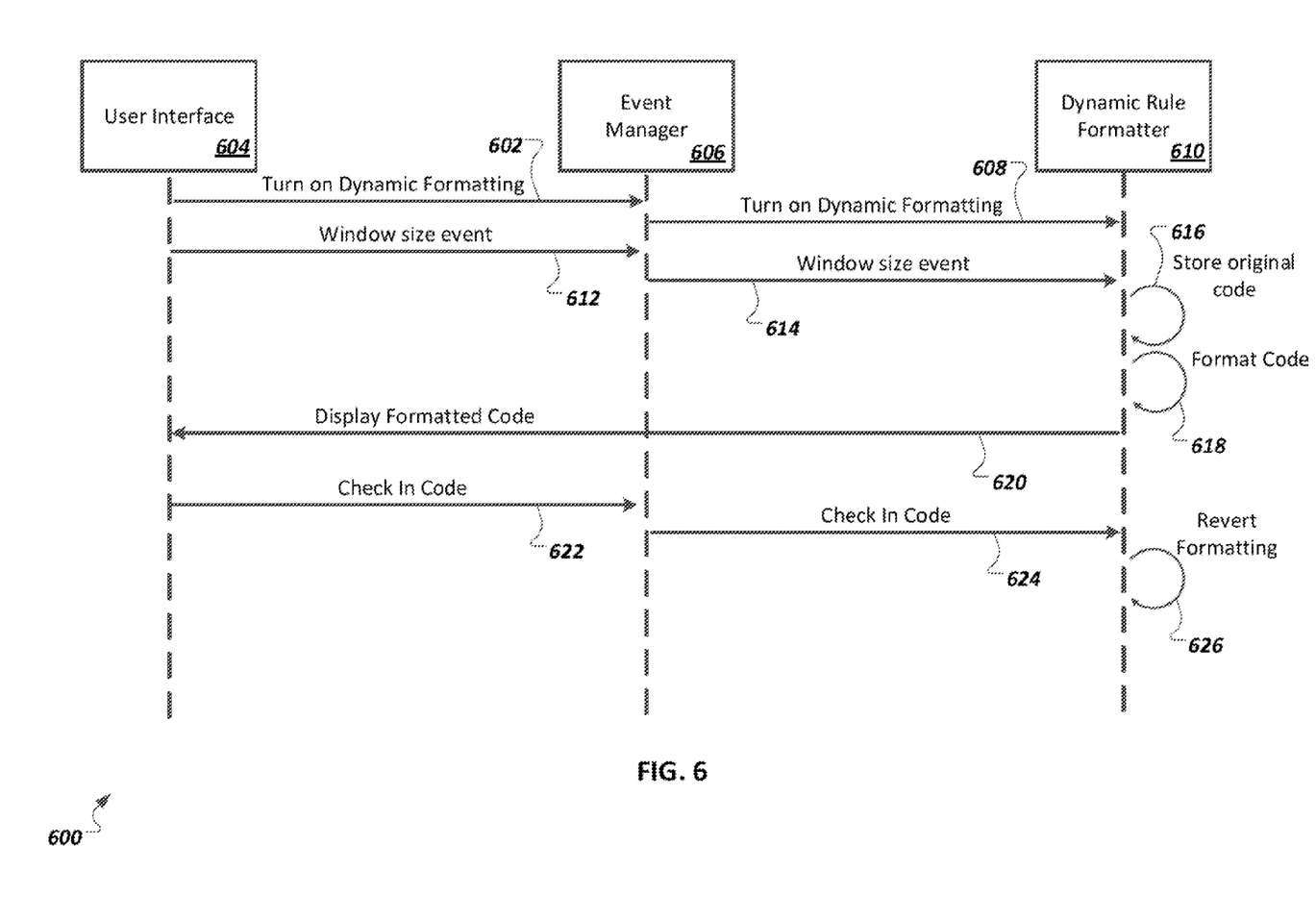
FIG. 6 is a swim lane diagram of an example method for dynamically formatting source code.

FIG. 6 is a swim lane diagram of an example method 600 for dynamically formatting source code. At 602, an event relating to a user using a user interface 604 to turn on dynamic formatting of software source code is forwarded to an event manager 606. At 608, the event manager 606 forwards the event to a dynamic rule formatter 610 associated with a programming editor. In some implementations, dynamic rule formatting is turned on by default in the programming editor and the user does not need to turn on dynamic formatting. In some implementations, the event manager 606 manages events associated with the programming editor and forwards particular types of events to the dynamic rule formatter 610, such as events relating to the size of a programming editor window.

In some implementations, multiple dynamic rule formatters 610 can exist, such as one dynamic rule formatter 610 for each of multiple, different types of programming languages. The event manager 606 can, for example, identify a particular type of software source code being edited in the programming editor and forward (e.g., using an API (Application Programming Interface) the event regarding the turning on of dynamic formatting for the particular type of software source code to a dynamic rule formatter 610 that is associated with the particular type of software source code.

The event manager can use the API to notify the dynamic rule formatter 610 of other types of events, as described below.

For example, at 612, an event relating to the size of a programming editor window is sent from the user interface 604 to the event manager 606. For example, event information can indicate that the window has been loaded with an initial size. As another example, event information can indicate that the window has been resized to a particular window size. As yet another example, event information can indicate that the window is now or is no longer partially covered by another window. At 614, the event relating to the size of the programming editor window is forwarded to the dynamic rule formatter 610.

At 616, the dynamic rule formatter 610 stores software source code as currently displayed in the programming editor window. The dynamic rule formatter 610 can store the software source code, for example, for purposes of reverting to the saved source code, as described in more detail below.

At 618, the dynamic rule formatter 610 formats the software source code in response to the event relating to the size of the window. For example, as described above, the dynamic rule formatter 610 can identify a currently visible portion of the programming editor window and a content type of the software source code, identify syntax rules associated with the content type, and determine dynamic formatting rules based on the syntax rules of the content type and the currently visible portion of the window. At 620, the dynamic formatting rules are applied to display the software source code in the currently visible portion of the programming editor window in response to the event relating to the size of the window. The applying of the dynamic formatting rules can result in the changing of the software source code.

At 622, the event manager 606 receives an event regarding a request to check in the software source code, to a version control system, for example. The check-in request can be received, for example, from the user interface 604 (e.g., from a version control client that may or may not be associated with the programming editor). At 624, the check-in request event is forwarded to the dynamic rule formatter 610. At 626, the dynamic rule formatter 610 reverts the formatting applied at 620. For example, the dynamic rule formatter can apply default formatting to the software source code to undo the formatting applied at 620 or can retrieve the software source code previously saved at 616. The software source code can be checked in to the version control system without the formatting applied at 620. The checked-in software source code can include, for example, any changes made by the programmer to the software source code, but not formatting changes made by the dynamic rule formatter 610.

Although the description above of the process 600 discusses the possible modification of the software source code when the dynamic formatting rules are applied, in some implementations, the applying of the dynamic formatting rules may modify the appearance of the software source code without changing the underlying software source code itself. If applying the dynamic formatting rules only changes the appearance of the software source code, the storing of original code at 618 and the reverting of the applied formatting at 626 might not be performed.

Figure 7:
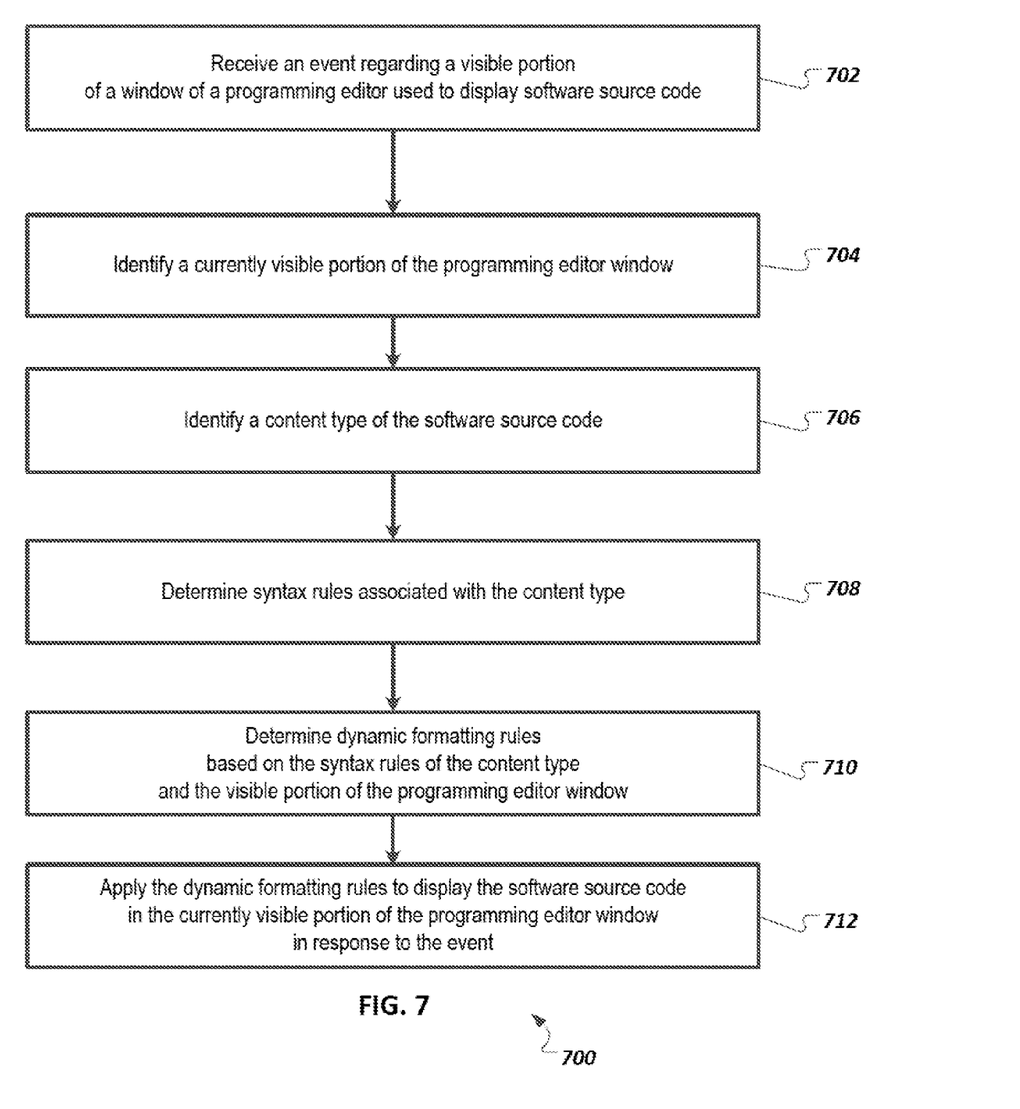
FIG. 7 is a flowchart of an example method for dynamically formatting source code.

FIG. 7 is a flowchart of an example method 700 for dynamically formatting source code. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the dynamic formatter 116 of FIG. 1.

At 702, an event regarding a visible portion of a window of a programming editor used to display software source code is received. For example, the event can be the loading of the window. As another example, the event can be a resizing of the window. As yet other examples, the event can be that the window is partially covered by another window or is now not partially covered after being partially covered. The other window can be a window associated with the programming editor or some other window. In some implementations, the event can be the movement of another window that is overlapping the window. The window can be partially covered by more than one window. Although events regarding the visible portion of the window are described above, in some implementations, other types of events can be received which may impact the amount of visible software source code in the window. For example, a font size change event can be received.

At 704, a currently visible portion of the programming editor window is identified. If the event is a loading of the window, the currently visible portion can correspond to the initial size of the window. If the event is a resizing of the window, the currently visible portion can correspond to the new size of the window after the window has been resized. If the event is that the window is partially covered by another window, the currently visible portion can be the portion not covered by the other window. If the event is that the window is no longer partially covered, the currently visible portion can be the same as when the window was not covered. If the window is partially covered by more than one window and the event is the moving of one of the windows partially covering the window, the portion that is currently visible after the moving can be determined.

At 706, a content type of the software source code is identified. The content type can be, for example, a programming language type or some other content type. In some implementations, the content type is identified based on a file extension of a file that includes the software source code.

At 708, syntax rules associated with the content type are determined. For example, the syntax rules can be rules regarding tokenization of the content type or line break rules associated with the content type. Tokenization rules can include rules for acceptable use of white space and punctuation, or rules for identifying identifiers in the source code. Line break rules can include rules regarding whether certain types of statements or portions of statements can span multiple lines of source code or whether a statement or statement portion has to be included on a single line of source code to be syntactically correct.

At 710, dynamic formatting rules are determined based on the syntax rules of the content type and the currently visible portion of the window. For example, a dynamic formatting rule may indicate whether and how to split a line of source code onto multiple lines while maintaining syntax correctness of the source code. As another rule, a dynamic formatting rule may indicate candidate font faces and font sizes and, in some implementations, a preference weight for each font face or font size.

At 712, the dynamic formatting rules are applied to display the software source code in the currently visible portion of the programming editor window in response to the event. In some implementations, the applying of the dynamic formatting rules changes the appearance of the source code in the window but does not change the underlying source code. For example, the applying can result in an increase in the number of visible characters of the software source code in the window. For example, one or more of the following can be modified: font face, font size, default tab width, border spacing or padding, or line spacing.

In some implementations, the underlying source code is changed as a result of applying the dynamic formatting rules. Applying the dynamic formatting rules can include ensuring that any inserted line break complies with language statement format rules regarding line breaks, for example. Applying the dynamic formatting rules can include ensuring that tokens of the software source code are maintained during the applying, such as after splitting a source code line onto multiple lines of the window.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method of dynamically formatting source code, comprising:
receiving an event regarding a visible portion of a window of a programming editor used to display software source code;
identifying a currently visible portion of the programming editor window;
identifying a content type of the software source code;
determining syntax rules associated with the content type, the syntax rules including at least one of rules for tokens included in the software source code and statement format rules regarding statement format with respect to line breaks;
determining dynamic formatting rules based on the syntax rules of the content type and the currently visible portion of the programming editor window; and
applying the dynamic formatting rules to display the software source code in the currently visible portion of the programming editor window in response to the event, including at least one of ensuring that tokens of the software source code are maintained during the applying and ensuring that any inserted line break complies with the statement format rules.

2. The method of claim 1, wherein the event is a resizing of the programming editor window.

3. The method of claim 1, wherein the event is a loading of the programming editor window.

4. The method of claim 1, wherein the event is a first notification that the programming editor window is partially covered by a second window.

5. The method of claim 4, wherein the second window is associated with the programming editor.

6. The method of claim 4, wherein the second window is not associated with the programming editor.

7. The method of claim 1, wherein the event is a second notification that the programming editor window is no longer partially covered by the second window.

8. The method of claim 1, wherein the dynamic formatting rules include one or more rules for wrapping a single line of source code onto multiple lines of the programming editor window.

9. The method of claim 1, wherein applying the dynamic formatting rules comprises modifying the software source code.

10. The method of claim 9, further comprising reverting the modifications to the software source code.

11. The method of claim 1, wherein applying the dynamic formatting rules comprises changing the appearance of the software source code in the programming editor window without modifying the software source code.

12. The method of claim 1, wherein applying the dynamic formatting rules includes determining that the displayed software code is syntactically correct according to the identified syntax rules.

13. The method of claim 1, wherein applying the dynamic formatting rules comprises increasing a number of visible characters of the software source code.

14. The method of claim 1, wherein the event is a DOM (Document Object Model) event.

15. A system comprising:
one or more computers; and
a computer-readable medium coupled to the one or more computers having instructions stored thereon which, when executed by the one or more computers, cause the one or more computers to perform operations comprising:
receiving an event regarding a visible portion of a window of a programming editor used to display software source code;
identifying a currently visible portion of the programming editor window;
identifying a content type of the software source code;
determining syntax rules associated with the content type, the syntax rules including at least one of rules for tokens included in the software source code and statement format rules regarding statement format with respect to line breaks;
determining dynamic formatting rules based on the syntax rules of the content type and the currently visible portion of the programming editor window; and
applying the dynamic formatting rules to display the software source code in the currently visible portion of the programming editor window in response to the event, including at least one of ensuring that tokens of the software source code are maintained during the applying and ensuring that any inserted line break complies with the statement format rules.

16. The system of claim 15, wherein the dynamic formatting rules include one or more rules for wrapping a single line of source code onto multiple lines of the programming editor window.

17. A computer program product encoded on a non-transitory storage medium, the product comprising non-transitory, computer readable instructions for causing one or more processors to perform operations comprising:
- receiving an event regarding a visible portion of a window of a programming editor used to display software source code;
- identifying a currently visible portion of the programming editor window;
- identifying a content type of the software source code;
- determining syntax rules associated with the content type, the syntax rules including at least one of rules for tokens included in the software source code and statement format rules regarding statement format with respect to line breaks;
- determining dynamic formatting rules based on the syntax rules of the content type and the currently visible portion of the programming editor window; and
- applying the dynamic formatting rules to display the software source code in the currently visible portion of the programming editor window in response to the event, including at least one of ensuring that tokens of the software source code are maintained during the applying and ensuring that any inserted line break complies with the statement format rules.

18. The computer program product of claim 17, wherein the dynamic formatting rules include one or more rules for wrapping a single line of source code onto multiple lines of the programming editor window.

\* \* \* \* \*